United States Patent
Hays et al.

(10) Patent No.: US 10,248,514 B2
(45) Date of Patent: Apr. 2, 2019

(54) METHOD FOR PERFORMING FAILSAFE CALCULATIONS

(71) Applicant: Micro Motion, Inc., Boulder, CO (US)

(72) Inventors: Paul J Hays, Lafayette, CO (US); Dawn Kelsch, Broomfield, CO (US)

(73) Assignee: Micro Motion, Inc., Boulder, CO (US)

( * ) Notice: Subject to any disclaimer, the term of this patent is extended or adjusted under 35 U.S.C. 154(b) by 6 days.

(21) Appl. No.: 15/302,777

(22) PCT Filed: May 8, 2014

(86) PCT No.: PCT/US2014/037343
§ 371 (c)(1),
(2) Date: Oct. 7, 2016

(87) PCT Pub. No.: WO2015/171152
PCT Pub. Date: Nov. 12, 2015

(65) Prior Publication Data
US 2017/0031786 A1   Feb. 2, 2017

(51) Int. Cl.
*G06F 8/41*   (2018.01)
*G06F 11/07*   (2006.01)
*G06F 11/14*   (2006.01)

(52) U.S. Cl.
CPC ............ *G06F 11/1492* (2013.01); *G06F 8/41* (2013.01); *G06F 11/0796* (2013.01); *G06F 11/1487* (2013.01); *G06F 11/1497* (2013.01); *G06F 2201/805* (2013.01); *G06F 2201/865* (2013.01)

(58) Field of Classification Search
CPC .................................................. G06F 11/0751
USPC ................................ 714/819, 824, 816, 812
See application file for complete search history.

(56) References Cited

U.S. PATENT DOCUMENTS

| 5,862,224 A | * | 1/1999 | Gilbert | ............... G06Q 20/341 380/28 |
| 7,661,228 B1 | | 2/2010 | Osecky | |
| 9,612,922 B2 | * | 4/2017 | Geiger | ............... G06F 11/1641 |
| 2005/0138485 A1 | | 6/2005 | Osecky et al. | |

(Continued)

FOREIGN PATENT DOCUMENTS

JP   2006252548 A   9/2006

OTHER PUBLICATIONS

Janek H. Patel et al: "Concurrent Error Detection in ALU's by Recomputing with Shifted Operands", [online], IEEE Transactions on Computers, Jul. 1982, Internet <URL:http://ieeexplore.ieee.org/document/1676055/>.

(Continued)

*Primary Examiner* — Fritz Alphonse
(74) *Attorney, Agent, or Firm* — The Ollila Law Group LLC

(57) ABSTRACT

A method and device for performing failsafe computation, and a method of compiling code to perform a failsafe computation are provided. The method includes performing a first calculation (212) to generate a first result (214). A second calculation (218) is performed using a scalar (216) and the first calculation (212) to generate a second result (220). The second calculation (218) includes multiplying the first calculation (212) by the scalar (216) to generate a scaled result, and dividing the scaled result by the scalar (216) to generate the second result (220). The first result (214) and the second result (220) are compared to determine if they are equivalent.

21 Claims, 4 Drawing Sheets

(56) References Cited

U.S. PATENT DOCUMENTS

| | | | |
|---|---|---|---|
| 2010/0125836 A1 | 5/2010 | Sazegari et al. | |
| 2012/0221897 A1* | 8/2012 | Richter | G06F 11/1487 714/37 |
| 2014/0129871 A1* | 5/2014 | Poenaru | G06F 11/07 714/2 |
| 2017/0222798 A1* | 8/2017 | Morel | H04L 7/0337 |

OTHER PUBLICATIONS

"Understanding C Language from Its Structure", Nikkei Software, Nikkei Business Publication, Inc., vol. 10, No. 13, pp. 123-125, Nov. 24, 2007.

Janek H. Patel et al: "Concurrent Eror Detection in Multiply and Divide Arrays", IEEE Transactions on Computers, vol. c-32, No. 4, Apr. 1983, pp. 417-422, Apr. 183, XP 000648331.

* cited by examiner

METHOD FOR PERFORMING FAILSAFE CALCULATIONS

TECHNICAL FIELD

The present invention relates to computing, and more particularly, to methods and a device for performing failsafe calculations on a computer.

BACKGROUND OF THE INVENTION

There is an increasing need for instruments that can safely operate critical systems, or systems that present a high risk to human health and environment in the event of a failure. Beyond reducing risk by designing redundant hardware components and ensuring that software is error-free, it may also be desirable to operate critical systems in a manner that ensures failsafe computations. By failsafe computations, what is meant is that no calculation errors will be introduced as a result of a faulty software math library or a hardware-based processor.

Various standards have been created to ensure failsafe computations, which are also referred to as: Safety Integrity Level, Safety Instrumented Level, Safety Instrumented Systems, safety engineering, calculation integrity, or multiple redundant math. Failsafe computations typically include the use of multiple redundant math computations to ensure that any single computation error will be detected. For example, consider the following calculation:

$$x=y*2.0 \quad \text{(Calculation A)}$$

Calculation A may be implemented using C or C++ programming languages using the following source code:

float x, y;

$$x=y*2.0f; \quad \text{(Source Code A)}$$

In compiling Source Code A, the compiler may call floating-point emulation math libraries, or if available, a hardware-based floating point co-processor. If an error exists in the math library or co-processor, Calculation A may not be computed correctly. This sort of software math library-based or hardware co-processor based error may not be detected by testing software or hardware errors. In order to fulfill the failsafe computation standards described above, a system must be able to detect math library and co-processor computation errors.

A common method used to meet failsafe computation standards is to complete each calculation twice either using unique math libraries or independent co-processors. For example, the following C or C++ programming language code implements a failsafe computation using two math libraries:

float x, y;
double xd, yd;

$$x=y*2.0f;$$

$$xd=yd*(double)2.0;$$

if (x!=xd){<code to put device in safe state>}//error detected! (Source Code B)

In Source Code B, Calculation A is performed twice, once using a floating point math library and once using a double precision math library. The variables y and yd have the same value, but different types. The results x and xd are then compared to one another to determine if an error occurred. When Calculation A is performed as provided by Source Code B, single computation faults may be detected and the computation is considered to be failsafe.

There are many disadvantages to the present methodologies for ensuring a failsafe computation. For example, the electronic device that will be used to perform the failsafe computation must incur the additional complexity and overhead of supporting multiple math libraries or multiple co-processors.

A second disadvantage is that math carried out in different data types may support different resolutions, or significant figures. This necessitates complex error-prone analysis to ensure that given the range of inputs, successful coverage is provided to carry out the calculations appropriately.

A third disadvantage is that coding redundant calculations into source code may become a design and maintenance hazard, especially when compared to source code that only includes single calculations.

A fourth disadvantage stems from the fact that failsafe calculations may require memory protection to ensure that memory corruption cannot upset the calculations in an undetectable way. While Source Code A may be able to identify single-bit failures, additional protection may be needed to defend against corrupt pointer failures to provide further failsafe computation protection. For example, the variables x, y, xd, and yd from Source Code A may be co-located in memory, and are thus vulnerable to being collectively overwritten by a corrupt pointer. For example, if zeros were mistakenly written to x, y, xd, and yd by a corrupt pointer, a simple compare between x and xd would not identify this computation failure. To protect against corrupt pointer failure, additional hardware such as a memory protect unit, additional software such as inversion storage of xd, yd, or special compiler/linker commands to ensure diverse locations may also be required to provide a failsafe computation.

What is needed is a failsafe computation method that allows for the elimination of multiple math libraries, multiple hardware math accelerators, error-prone fixed point resolution analysis, and corrupt pointers. Ideally, the failsafe computation method will be easy to implement and maintain, requiring little modification to source code.

SUMMARY OF THE APPLICATION

A method for performing failsafe computation is provided. The method includes the step of performing a first calculation to generate a first result. The method further includes the step of performing a second calculation using a scalar and the first calculation to generate a second result, the second calculation including multiplying the first calculation by the scalar to generate a scaled result, and dividing the scaled result by the scalar to generate the second result. The method further includes the step of comparing whether the first result and the second result are equivalent.

A device for performing failsafe computation to operate hardware is provided. The device includes electronics configured to perform a first calculation to generate a first result. The electronics are further configured to perform a second calculation using a scalar and the first calculation to generate a second result. The second calculation includes multiplying the first calculation by the scalar to generate a scaled result. The second calculation further includes dividing the scaled result by the scalar to generate the second result. The electronics are further configured to indicate whether the first result and the second result are equivalent.

A method for compiling code to operate hardware in a failsafe manner is provided. The method includes the step of identifying a first calculation configured to generate a first result. The method further includes the step of generating a second calculation including the first calculation and a scalar, the second calculation generating a second result. The second calculation includes multiplying the first calculation by the scalar to generate a scaled result. The second calculation further includes dividing the scaled result by the scalar to generate the second result. The method further includes the step of generating an indication of whether the first result and the second result are equivalent. The method further includes the step of including the first calculation, the second calculation, and the indication in an executable program.

ASPECTS OF THE APPLICATION

In one embodiment of the method, the method comprises the step of performing a safe operation if the first result and the second result are not equivalent.

In one embodiment of the method, the first calculation includes one or more operations, the one or more operations including a final operation, and wherein the second calculation includes multiplying the scalar before the final operation.

In one embodiment of the method, the first result has a first binary representation and the scaled value has a second binary representation, and the scalar is selected to maximize the difference between the first binary representation and the second binary representation.

In one embodiment of the method, the scalar is an integer, a floating point, or a double.

In one embodiment of the method, the scalar is an irrational number.

In one embodiment of the method, a difference between the scalar and 1.0 is minimized to preserve resolution of the scaled result.

In one embodiment of the method, the method further includes the step of adding an offset to the first result if the first result is determined to be zero.

In one embodiment of the device, the electronics is further configured to perform a safe operation if the first result and the second result are not equivalent.

In one embodiment of the device, the first calculation includes one or more operations, the one or more operations including a final operation, and wherein the second calculation includes multiplying the scalar before the final operation.

In one embodiment of the device, the first result has a first binary representation and the scaled value has a second binary representation, and the scalar is selected to maximize the difference between the first binary representation and the second binary representation.

In one embodiment of the device, the scalar is an integer, a floating point, or a double.

In one embodiment of the device, the scalar is an irrational number.

In one embodiment of the device, a difference between the scalar and 1.0 is minimized to preserve resolution of the scaled result.

In one embodiment of the device, the electronics is further configured to add an offset to the first result if the first result is determined to be zero.

In one embodiment of the method, generating the second calculation including the first calculation and the scalar and generating the indication of whether the first result and the second result are equivalent includes defining a class.

In one embodiment of the method, the method further includes the step of storing the first result and the second result in distant sections of memory.

In one embodiment of the method, the method further includes the step of storing the first calculation and the second calculation in distant sections of memory.

In one embodiment of the method, including the first calculation, the second calculation, and the indication in an executable program includes compiling the executable program to run on a single processor.

In one embodiment of the method, including the first calculation, the second calculation, and the indication in an executable program includes compiling the executable program to use a single math library.

In one embodiment of the method, the method further includes the step of pretesting a math library for computation errors.

BRIEF DESCRIPTION OF THE DRAWINGS

The same reference number represents the same element on all drawings. The drawings are not necessarily to scale.

DETAILED DESCRIPTION

FIGS. 1-4 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1:
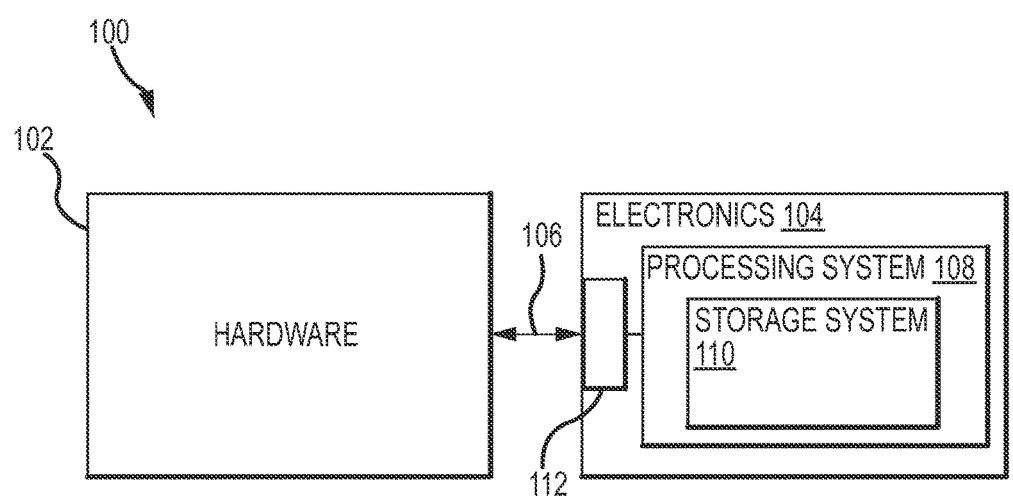
FIG. 1 depicts a block diagram of failsafe system 100 according to an embodiment of the Application.

FIG. 1 depicts a block diagram of failsafe system 100 in accordance with an embodiment of the invention. Failsafe system 100 includes hardware 102, electronics 104, and hardware-software communication line 106. Failsafe system 100 may include instruments and/or equipment that is critical to health and safety of humans and/or environment and must therefore be operated in a failsafe environment.

Hardware 102 may be operated, controlled, monitored, and read by electronics 104. Hardware 102 may include any electronically operable or readable equipment for which it is highly desirable to provide failsafe operation. For example, hardware 102 may be a component of a system found in emergency services, in a fire protection system, in telecommunications, in a medical device, in a nuclear reactor, in aviation, or in space flight. Hardware 102 may be included in other applications as well, as will be understood by those skilled in the art. In an embodiment, hardware 102 may include a measurement or monitoring device. For example, hardware 102 may include a vibrating flowmeter that may determine the flow rate, density, or viscosity of a fluid.

Signals may be sent back and forth between hardware 102 and electronics 104 over communication line 106. For example, electronics 104 may send signals to configure and command hardware 102 or to request data over communication line 106. Hardware 102 may furthermore send data to electronics 104 when prompted by events internal to hardware 102. It should be appreciated that in embodiments communication line 106 may be wired or wireless, as will be understood by those skilled in the art.

Electronics 104 may further include an interface 112 and a processing system 108. The processing system 108 may further include a storage system 110. Electronics 104 may process signals received from hardware 102 in order to determine various properties of failsafe system 100.

Interface 112 may receive sensor signals over communication line 106, or over additional leads. Interface 112 may perform any necessary or desired signal conditioning, such as any manner of formatting, amplification, buffering, etc. Alternatively, some or all of the signal conditioning may be performed in processing system 108. In addition, interface 112 may enable communications between electronics 104 and external devices. Interface 112 may be capable of any manner of electronic, optical, or wireless communication. In addition, interface 112 may enable communications between electronics 104 and external devices. Interface 112 may be capable of any manner of electronic, optical, or wireless communication.

Interface 112 in one embodiment may include a digitizer (not shown), wherein sensor signals received over communication line 106 comprise analog sensor signals. The digitizer may sample and digitize the analog sensor signals and produce digital sensor signals. The digitizer may also perform any needed decimation, wherein the digital sensor signal is decimated in order to reduce the amount of signal processing needed and to reduce the processing time.

Processing system 108 conducts operations of electronics 104 and processes measurements from and commands to hardware 102. Processing system 108 may also execute one or more processing routines such as failsafe calculation routine 200.

Processing system 108 may comprise a general purpose computer, a micro-processing system, a logic circuit, or any other general purpose or customized processing device capable of performing the functions described herein. Processing system 108 may be distributed among multiple processing devices. Processing system 108 may include any manner of integral or independent electronic storage medium, such as storage system 110.

Storage system 110 may store operational parameters and data, software routines, constant values, and variable values. Storage system 110 may comprise a primary or main memory, such as a random access memory (RAM). In embodiments, storage system 110 may include a hard disk drive, a removable storage device, a memory card, a floppy disk drive, a magnetic tape drive, a compact disk drive, a digital versatile disc, a Blue-ray disc, an optical storage device, tape backup, or any other computer useable or readable storage medium.

It should be understood that electronics 104 may include various other components and functions that are generally known in the art. These additional features are omitted from the description and the figures for the purpose of brevity. Therefore, the present invention should not be limited to the specific embodiments shown and discussed.

While FIG. 1 depicts only a single hardware 102 in communication with electronics 104, those skilled in the art will readily appreciate that multiple hardware assemblies may be in communication with electronics 104. Further, electronics 104 may be capable of operating a variety of different hardware types. Each hardware assembly, such as the hardware 102 in communication with electronics 104, may have a respective section of storage system 110 dedicated to the operation of that hardware.

Storage system 110 may store variables that may be used by failsafe calculation routine 200 to safely operate hardware 102. For example, storage system 110 may store a first result 214, a scalar 216, a second result 220, and an error indicator 222. Storage system 110 may also store functions that may be used by failsafe calculation routine 200 to safely operate hardware 102. For example, storage system 110 may store a first calculation 212, a second calculation 218, a first calculation logic 202, a second calculation logic 204, a compare logic 206, and a safe operation logic 208. Storage system 110 may also store failsafe calculation routine 200.

In an embodiment, electronics 104 may initiate and operate failsafe calculation routine 200 in order to safely operate hardware 102. In embodiments, failsafe calculation routine 200 may perform redundant math operations to ensure the safe operation and interpretation of data from hardware 102.

Figure 2:
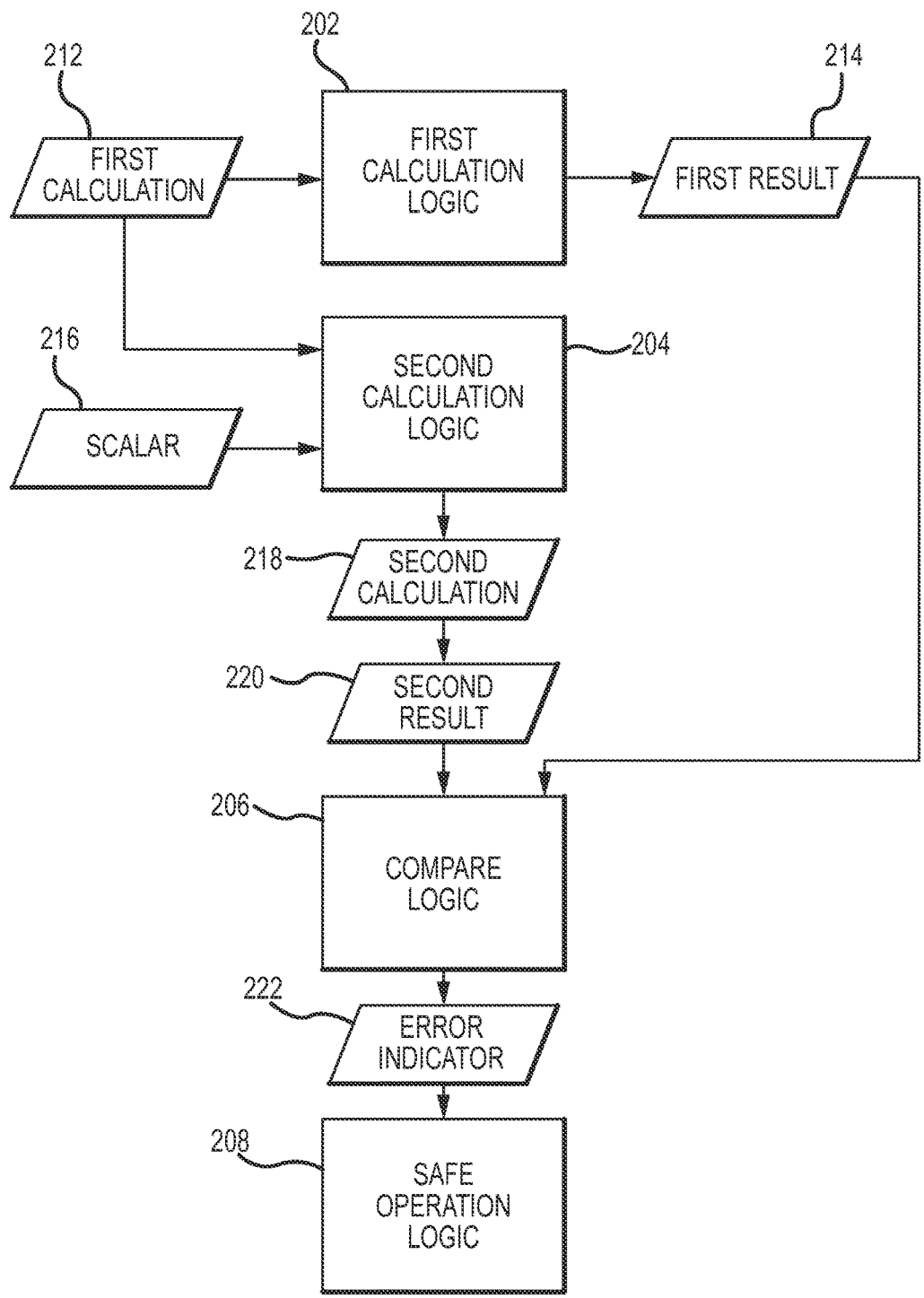
FIG. 2 depicts a failsafe calculation routine 200 according to an embodiment of the Application.

FIG. 2 depicts failsafe calculation routine 200, in accordance with an embodiment of the Application. Failsafe calculation routine 200 includes first calculation logic 202, second calculation logic 204, compare logic 206, and safe operation logic 208.

Failsafe calculation routine 200 begins with first calculation logic 202. First calculation logic 202 receives a first calculation 212 and generates first result 214. First calculation 212 includes one or more math operations that may be performed on a processor in a failsafe manner. For example, first calculation logic 202 may include the following non-exclusive list of math operations: addition, subtraction, multiplication, division, etc. First result 214 is the result of performing first calculation 212 on processing system 108. In embodiments, first result 214 may be a number represented in any data type or form, including the following non-exclusive list: an integer, a signed number, an unsigned number, a short number, a long number, a floating point number, a double precision number, or any other data type known to those skilled in the art. In a simple example, first calculation 212 may include the following logic:

$$x1 = y1*2.0 \qquad \text{(Calculation B)}$$

In the example of Calculation B, first calculation 212 is y1*2.0, and first result 214 is x1.

Failsafe calculation routine 200 continues with second calculation logic 204. Second calculation logic 204 receives first calculation 212 and scalar 216 and generates second calculation 218 and second result 220. Scalar 216 is a number that may be used as an aid in performing failsafe computations. Scalar 216 may be any data type, including but not limited to an integer, a constant, a signed, an unsigned, a floating point, a double precision, a short, a long number, or any other type commonly known to those of skill in the art.

As previously discussed, first calculation 212 includes one or more math operations. Second calculation logic 204 generates second calculation 218 by including the further math operations of multiplying and dividing by scalar 216. Source Code B provides an example implementation of second calculation logic 204:

$$x1 = y1*2.0f;$$

$$x2 = ((y2*1.2f)*2.0f)/1.2f); \qquad \text{(Source Code B)}$$

In Source Code B, y1*2.0f represents first calculation 212, ((y2*1.2f)*2.0f)/1.2f) represents second calculation 218, scalar 216 is equal to 1.2, first result 214 is represented by x1, and second result 220 is represented by x2. The variables y1 and y2 in Source Code B have the same value, and in embodiments y1 and y2 may have the same or different data types. It may be seen in Source Code B that first calculation 212 includes multiplying variable y1 by constant 2.0f. Second calculation logic 204 scales first calculation 212 by multiplying first calculation 212 by a scalar 216, the scalar being 1.2f in the example of Source Code B, generating a scaled result. Those skilled in the art will recognize that scalar 216 may be multiplied before, after, or between any of the one or more operations included with first calculation 212 to generate the scaled result. In an embodiment, the operation of multiplying scalar 216 may be included before a final operation in performing the first calculation 212 to generate the scaled result. Second calculation logic 204 further transforms first calculation 212 by dividing the scaled result by scalar 216, generating second result 220. Second result 220 may be any data type, including but not limited to an integer, a constant, a signed, an unsigned, a floating point, a double precision, a short, a long number, or any other type commonly known to those of skill in the art.

It should be appreciated that first calculation 212 and second calculation 218 provide redundant math computations, with the second calculation simply being the first calculation multiplied and divided by scalar 216. Despite the fact that first and second calculations 212 and 218 may be performed on the same processor or with the same math library, they are performed on different sets of numbers. Therefore, in most circumstances, first and second calculations 212 and 218 represent unique math computations. In the example of Source Code B, first calculation 212 is a simple multiplication operation. This is not intended to be limiting, however. In further embodiments, first calculation 212 may include any number of math operations.

When the variables used in first calculation 212 are zero, however, first calculation 212 and second calculation 218 may not necessarily represent unique math computations. For example, if y1 and y2 of Source Code B are zero, the use of scalar 216 will not result in unique computations. In such circumstances, second calculation logic 204 may use both an offset and a scalar to preserve the redundancy of the computations. Source Code C provides an example implementation of using both an offset and a scalar:

$x1=y1*2.0f;$ $x2=((((y2+z)*1.2f)*2.0f)/1.2f)-(z*2.0f).$ (Source Code C)

In Source Code C, z represents an offset. Therefore, if y1 and y2 are zero, the uniqueness of first and second calculations 212 and 218 will be preserved.

Using an offset may provide extra code complexity and software run time, however. An alternative to including an offset is to pre-test the math library or co-processor in question to prove success in the case where the variables used in the first and second calculations 212 and 218 are zero.

It should be noted that the selection of scalar 216 requires analysis, and may depend on the math library and/or the co-processor used. Generally speaking, the value of scalar 216 should not be set to 1 or zero, because such values will not provide unique first and second calculations 212 and 218. In an embodiment, scalar 216 is selected to maximize the difference between the binary representation of the first result 214 and the binary representation of the scaled result to aid in the detection of a corrupt computation.

In embodiments, scalar 216 may be selected to be close to 1.0 to conserve resolution of first and second calculations 212 and 218 for integer-based math operations. In embodiments, scalar 216 may be an irrational number. For example, a value for scalar 216 of 2.222222 is a reasonable selection in IEEE-754 floating point representation. As an irrational number in the binary world, value 2.222222 provides for radically different mantissas, which may provide for big differences between the bit-representations of numbers. The examples of numbers and their scaled values are provided below using IEEE-754 representation and a scalar of 2.222222:

1.000000 (in hex: 3F800000)

$1.000000 \times 2.222222 = 2.222222$ (in hex: 400$E$38$E$3)

1000000 (in hex: 49742400)

$1000000 \times 2.222222 = 2222222$ (in hex: 4$A$07$A$238)

0.4500000 (in hex: 3EE66666)

$0.4500000 \times 2.222222 = 1.000000$ (in hex: 3$F$800000)

Choosing a value for scalar 216 that preserves resolution of the first and second calculations 212 and 218 may thereby provide the advantage of aiding computation corruption detection.

Failsafe calculation routine 200 continues with compare logic 206. Compare logic 206 receives first result 214 and second result 220 and generates an error indicator 222. Compare logic 206 compares first result 214 to second result 220 to determine if the results are the same. Because first calculation 212 and second calculation 218 may be performed on the same co-processor and/or with the same math library, embodiments of the Application provide an advantage over the prior methods in that first result 214 and second result 220 may be the same data type. This may simplify the compare operation significantly, removing the need to perform an error-prone resolution analysis in comparing values of different types. If the first and second results 214 and 220 are the same, then the computation is considered to be failsafe. If the first and second results 214 and 220 are not the same, then an error condition may exist and compare logic 206 may indicate that an error condition exists by setting error indicator 222. In embodiments, error indicator 222 may be reported to a user via a display or an electronic message.

Failsafe calculation routine 200 continues with safe operation logic 208. Safe operation logic 208 receives error indicator 222. If error indicator 222 indicates that an error has occurred, safe operation logic 208 may perform operations to prevent damage or injury to persons or environment that may result due to the failed computations. In embodiments, safe operation logic 208 may initiate a safing procedure for hardware 102. In another embodiment, safe operation logic 208 may alert operators that measurements taken with hardware 102 may be in error.

Figure 3:
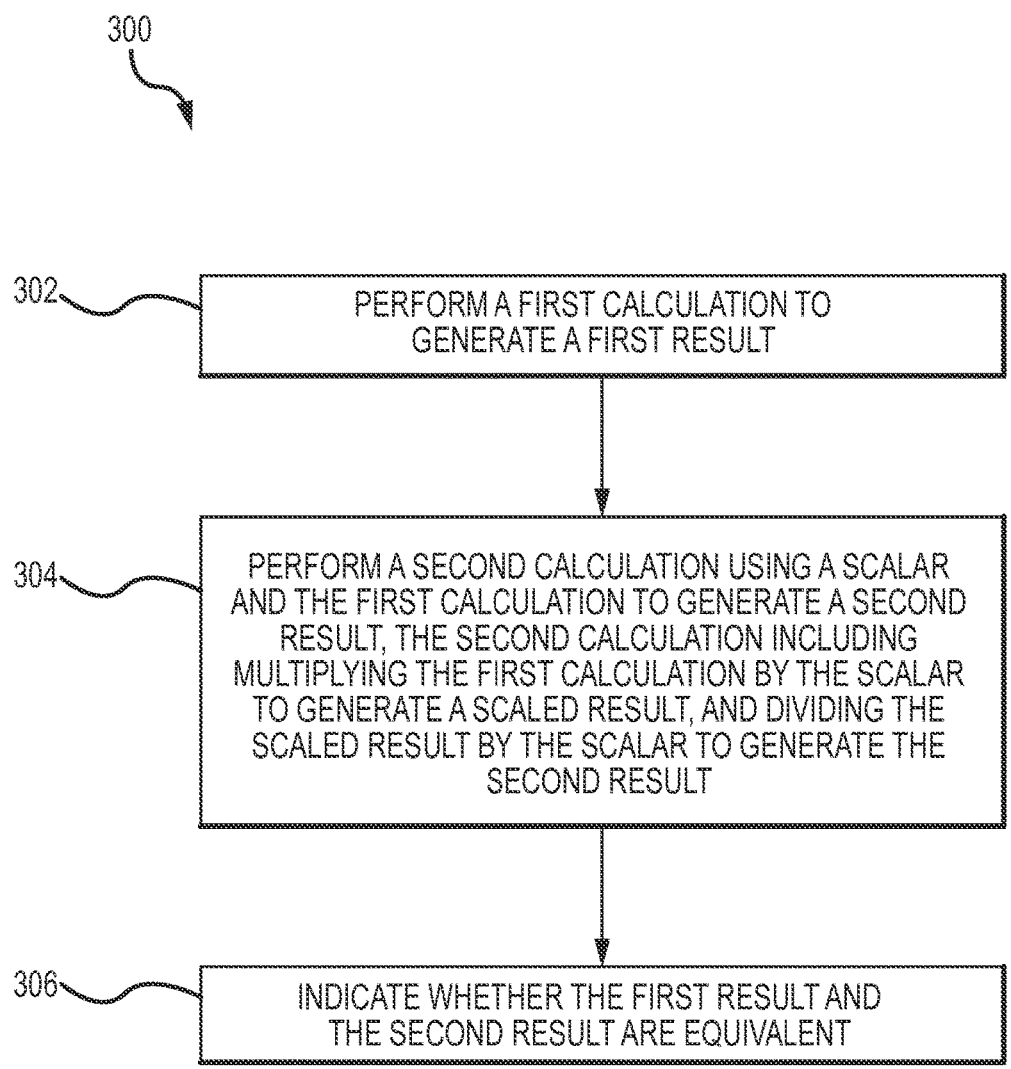
FIG. 3 depicts a failsafe calculation method 300 according to an embodiment of the Application.

FIG. 3 depicts failsafe calculation method 300. Failsafe calculation method 300 is an example embodiment of failsafe calculation routine 200. Processing system 108 may be configured to perform the necessary signal and data processing to execute failsafe calculation method 300. Failsafe calculation method 300 begins with step 302. In step 302, a first calculation is performed to generate a first result. For example, first calculation 212 may be performed by first calculation logic 202 to generate first result 214, as discussed above.

Failsafe calculation method 300 continues with step 304. In step 304, a second calculation is performed using a scalar and the first calculation to generate a second result, the second calculation including multiplying the first calculation by the scalar to generate a scaled result and dividing the scaled result by the scalar to generate the second result. For example, second calculation logic 204 may receive scalar 216, first calculation 212, and produce second calculation 218. Second result 220 may include the results of performing second calculation 218 on processing system 108, as discussed above.

Failsafe calculation method 300 continues with step 306. In step 306, it is indicated whether the first result and the second result are equivalent. For example, compare logic 206 may receive first result 214 and second result 220 and generate error indicator 222, as described above.

Figure 4:
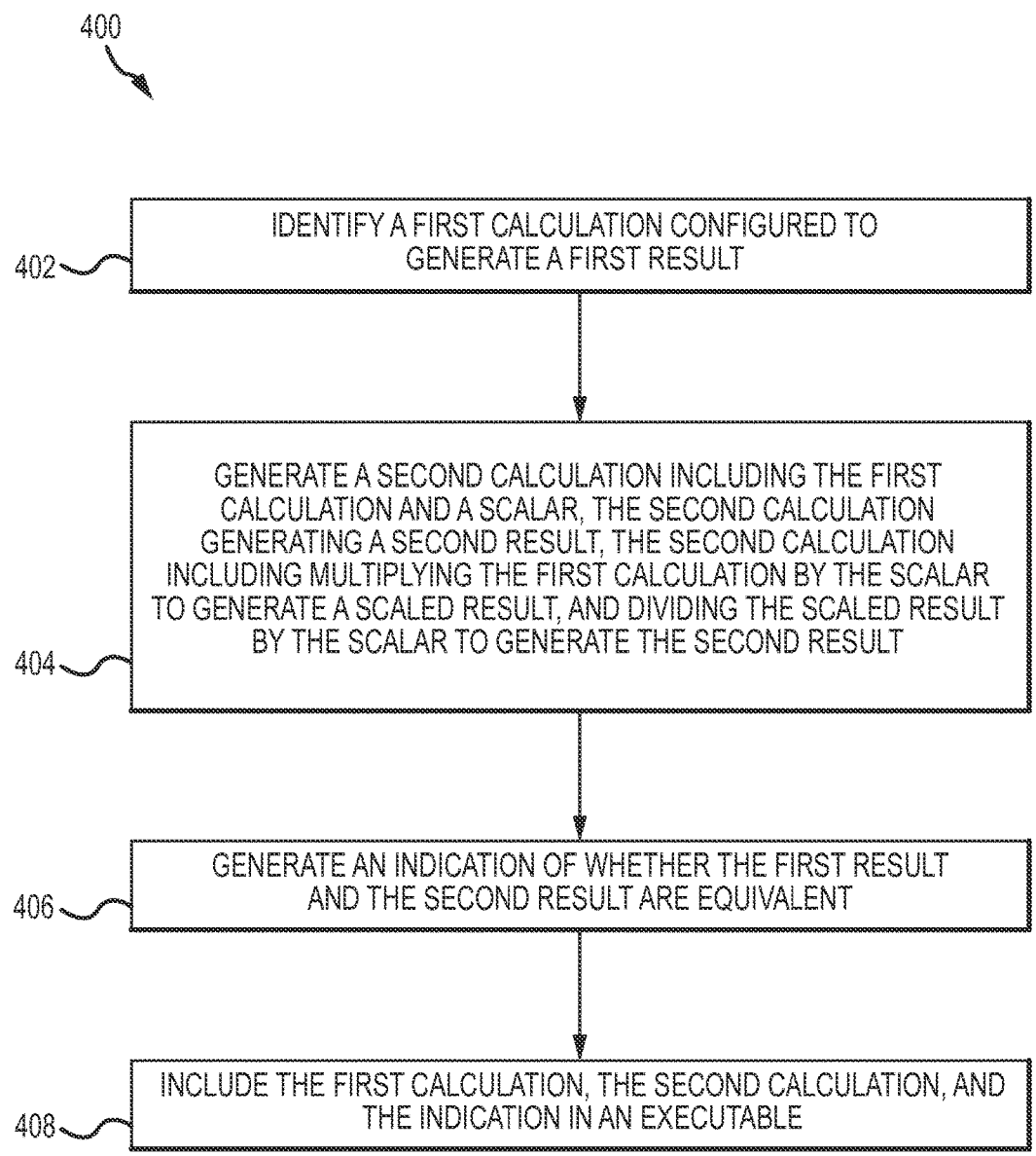
FIG. 4 depicts a failsafe calculation compilation method 400 according to an embodiment of the Application.

FIG. 4 depicts failsafe calculation compilation method 400. Failsafe calculation compilation method 400 may be performed to compile code into executable software that may execute failsafe calculations on processing system 108. For example, failsafe calculation compilation method 400 may be performed to compile code configured to execute failsafe calculation routine 200 or failsafe calculation method 300.

Method 400 begins with step 402. In step 402 a first calculation is identified that is configured to generate a first result. For example, first calculation 212 or Calculation A may be identified by a compiler.

Failsafe calculation compilation method 400 continues with step 404. In step 404 a second calculation is generated including the first calculation and a scalar, the second calculation generating a second result, the second calculation including multiplying the first calculation by the scalar to generate a scaled result, and dividing the scaled result by the scalar to generate the second result. For example, second calculation logic 204 may receive first calculation 212 and scalar 216, to generate second calculation 218 and second result 220.

Failsafe calculation compilation method 400 continues with step 406. In step 406 an indication is generated of whether the first result and the second result are equivalent. For example, compare logic 206 may generate error indicator 222, as discussed above.

Failsafe calculation compilation method 400 continues with step 408. In step 408 the first calculation, the second calculation, and the indication are included in an executable program. In embodiments, the executable program may be compiled to run on any type of computer commonly known to those of skill in the art. In embodiments, the software may be an executable software program or a library accessible by other executable software programs.

It will be appreciated that writing software code to include steps 402, 404, and 406 for every failsafe computation may add a considerable amount of complication to a software engineer's work. The additional complication may adversely impact the robustness and quality of the end software product. Therefore, in embodiments step 408 further provides that the functionality of steps 404 and 406 may be automatically generated during a software compile. By generating this code "under the hood" during the compilation of the software, the advantages of error-free, easy to maintain, robust software code may be provided. For example, the software engineer may write Source Code A, and the functionality of Source Code B may be included in the end product software executable during compile. Source Code A is easier to understand by inspection, far less error-prone to implement, and easier to port to other processors or computing systems than Source Code B.

Using features of a target programming language such as C, C++, Java, or any other programming language known to those of skill in the art, and using a compiler, it is possible to encapsulate the functionality of Source Code B when compiling Source Code A. For example, in the C and C++ programming languages, a class may be defined and used to encapsulate first calculation 212, second calculation 218, and a compare between first and second results 214, 220. Most computer languages provide some support for this type of encapsulation and complexity-hiding.

In embodiments, step 408 may further provide for failsafe computations by providing for the storage of the results of the independent calculations to portions of memory that are distant from one another. For example, any combination of first calculation 212, first result 214, scalar 216, second calculation 218, and second result 220 may be written to non-adjacent and/or distant sections of memory. Non-adjacent and/or distant sections of memory may include sections of memory with non-adjacent addresses in the same memory space, or memory found on different hardware components. In embodiments, some of the memory may include further hardware and/or software protections, as will be understood by those of skill in the art. It will be appreciated that by storing the results of the operations provided by steps 402, 404, and 406 in distant memory, the computations may be further protected against corrupt pointers.

In embodiments, step 408 may include the first calculation, the second calculation, and the indication in an executable program that operates on a single processor. In further embodiments, step 408 may include the first calculation, the second calculation, and the indication in an executable program that utilizes a single math library. In further embodiments, step 408 may include pre-testing a math library for errors.

The detailed descriptions of the above embodiments are not exhaustive descriptions of all embodiments contemplated by the inventors to be within the scope of the Application. Indeed, persons skilled in the art will recognize that certain elements of the above-described embodiments may variously be combined or eliminated to create further embodiments, and such further embodiments fall within the scope and teachings of the Application. It will also be apparent to those of ordinary skill in the art that the above-described embodiments may be combined in whole or in part to create additional embodiments within the scope and teachings of the invention.

Thus, although specific embodiments of, and examples for, the Application are described herein for illustrative purposes, various equivalent modifications are possible within the scope of the Application, as those skilled in the relevant art will recognize. The teachings provided herein may be applied to other meters, and not just to the embodiments described above and shown in the accompanying figures. Accordingly, the scope of the Application should be determined from the following claims.

What is claimed is:

1. A method for performing failsafe computation, the method comprising the steps of:
performing a first calculation to generate a first result using a single math library or using a single math co-processor;
performing a second calculation using a scalar and the first calculation to generate a second result using the single math library or using a single math co-processor, the second calculation including multiplying the first calculation by the scalar to generate a scaled result, and dividing the scaled result by the scalar to generate the second result; and indicating whether the first result and the second result are equivalent.

2. The method of claim 1, further comprising the step of: performing a safe operation if the first result and the second result are not equivalent.

3. The method of claim 1, wherein the first calculation includes one or more operations, the one or more operations including a final operation, and wherein the second calculation includes multiplying the scalar before the final operation.

4. The method of claim 1, wherein the first result has a first binary representation and the scaled value has a second binary representation, and the scalar is selected to maximize the difference between the first binary representation and the second binary representation.

5. The method of claim 1, wherein the scalar is an integer, a floating point, or a double.

6. The method of claim 1, wherein the scalar is an irrational number.

7. The method of claim 1, wherein a difference between the scalar and 1.0 is minimized to preserve resolution of the scaled result.

8. The method of claim 1, further comprising the steps of: adding an offset to the first result if the first result is determined to be zero.

9. A device for performing failsafe computation to operate a hardware (102), the device comprising:
an electronics (104) configured to:
perform a first calculation (212) to generate a first result (214) using a single math library or using a single math co-processor;
perform a second calculation (218) using a scalar (216) and the first calculation (212) to generate a second result (220) using the single math library or using the single math co-processor, the second calculation (218) including multiplying the first calculation (212) by the scalar (216) to generate a scaled result, and dividing the scaled result by the scalar (216) to generate the second result (220); and
indicate whether the first result (214) and the second result (220) are equivalent.

10. The device of claim 9, wherein the electronics (104) is further configured to perform a safe operation if the first result (214) and the second result (220) are not equivalent.

11. The device of claim 9, wherein the first calculation (212) includes one or more operations, the one or more operations including a final operation, and wherein the second calculation (218) includes multiplying the scalar (216) before the final operation.

12. The device of claim 9, wherein the first result (214) has a first binary representation and the scaled value has a second binary representation, and the scalar (216) is selected to maximize the difference between the first binary representation and the second binary representation.

13. The device of claim 9, wherein the scalar (216) is an integer, a floating point, or a double.

14. The device of claim 9, wherein the scalar (216) is an irrational number.

15. The device of claim 9, wherein a difference between the scalar (216) and 1.0 is minimized to preserve resolution of the scaled result.

16. The device of claim 9, wherein the electronics (104) is further configured to add an offset to the first result (214) if the first result (214) is determined to be zero.

17. A method for compiling a code to operate a hardware in a failsafe manner comprising the steps of:
identifying a first calculation configured to generate a first result using a single math library or using the single math co-processor;
generating a second calculation including the first calculation and a scalar, the second calculation generating a second result using the single math library or the single math co-processor, the second calculation including multiplying the first calculation by the scalar to generate a scaled result, and dividing the scaled result by the scalar to generate the second result;
generating an indication of whether the first result and the second result are equivalent; and
including the first calculation, the second calculation, and the indication in an executable program.

18. The method of claim 17, wherein generating the second calculation including the first calculation and the scalar and generating the indication of whether the first result and the second result are equivalent includes defining a class.

19. The method of claim 17, further comprising the steps of:
storing the first result and the second result in distant sections of memory.

20. The method of claim 17, further comprising the steps of:
storing the first calculation and the second calculation in distant sections of memory.

21. The method of claim 17, further comprising the step of:
pretesting the single math library for computation errors.

* * * * *